United States Patent Office 2,986,040
Patented May 30, 1961

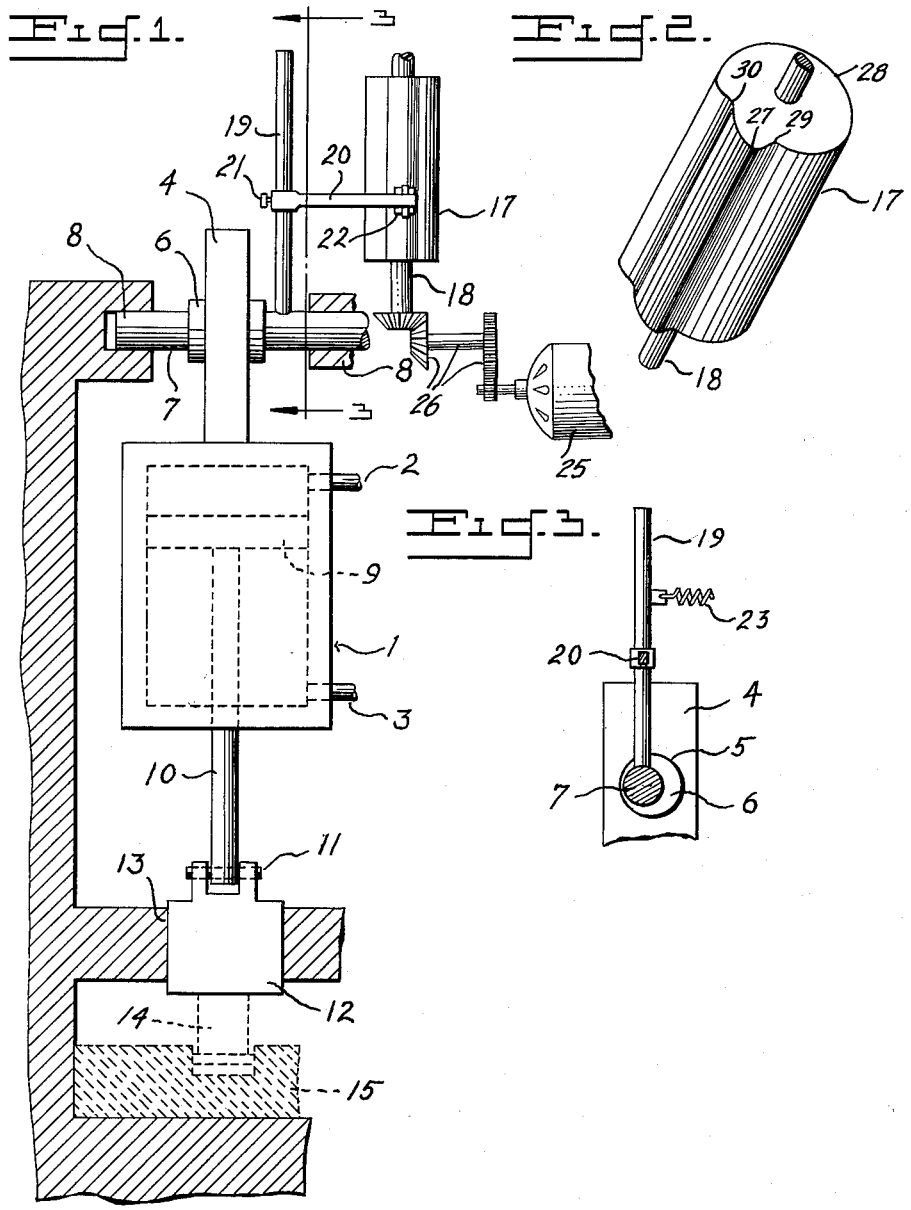

2,986,040
VARIABLE RECIPROCATING MOVEMENT TRANSMISSION
George S. Light, Winsted, Conn.
Filed July 15, 1957, Ser. No. 672,030
4 Claims. (Cl. 74—1)

This invention relates to power transmissions by which predetermined variations in the movement and in the timing of such movement and the variations therein may be imparted to reciprocating tools, forming devices and work or tool handling devices.

In the operation of devices of the above character it is frequently desirable to exert pressure or tension in successive increments of varying length of stroke or speeds and in timed relation to each other. Such requirements have heretofore been met by specialized transmission designed to meet the particular conditions of a given operation.

It is the object of the present invention to provide a transmission of the above character which is sufficiently flexible to permit its use for a wide variety of requirements with changes which are in the nature of adjustments or the easily accomplished interchange of parts, thus permitting the sequence, timing length of stroke and number of operational movements to be easily varied.

A further object is to provide a transmission of the character which is adaptable to automatic operation.

Other and further objects and advantages will be made apparent in the disclosure of the accompanying drawings and in the following specification and claims.

In the accompanying drawings,

Fig. 1 is an elevational view, partly in section, showing a device embodying the invention;

Fig. 2 is a generally perspective view of the cam controlling successive increments or variations of movement; and Fig. 3 is a detail sectional view substantially on line 3—3 of Fig. 1.

Referring to the drawings, 1 indicates a fluid power cylinder provided at its ends with inlet and outlet ports 2 and 3. The cylinder 1 is provided at one end with an extension 4 provided with an opening 5 in which a disc or cylinder 6 is rotatably mounted. Disc 6 is eccentrically secured on a shaft 7 which is mounted in suitable bearings 8.

The cylinder 1 is provided with a piston 9 carried by a piston rod 10 which extends through a suitable stuffing box, not shown, in the end of the cylinder opposite the extension 4. The outer end of rod 10 is pivotally connected as at 11 to one end of a member 12 reciprocably mounted in a guideway 13 carried by the supporting frame.

The member 12 carries whatever tool, forming device, or work or tool handling device to be actuated. By way of example and not limitation a stamping die is indicated in dotted lines at 14 as secured to carrier member 12 and cooperating with a stationary die 15. It will be understood that the specific device, carried by the member 12 forms no part of the present invention.

Fluid pressure from any suitable source, not shown, is alternately supplied and exhausted from the opposite sides of piston 9 through any suitable valve arrangement, not shown, which controls the normal length of stroke, and the timing thereof, of the carrier member 12, and therefore the device carried thereby. The normal reciprocatory movement thus imparted to member 12 is varied or modified by imparting a reciprocatory movement to cylinder 1, the latter movement being substantially coaxial with that imparted to the carrier by piston 9. Such movement is imparted to the cylinder by rotative movement imparted to eccentric 6 by a driven cam 17 fixed on a shaft 18. Fixed to shaft 7 and shown extending at right angles therefrom is a lever arm 19, which carries an arm 20 extending at right angles to arm 19 and mounted thereon for longitudinal adjustment longitudinally thereof as by a set screw 21. The free end of arm 20 carries a cam follower 22 which is held in operative engagement with cam 17 by a spring 23 connected between arm 19 and a stationary part of the machine frame. Cam shaft 18 is driven from any suitable source of power, such as an electric motor 25, through any suitable conventional transmission as indicated at 26. Cam 17 is provided with one or more highs as at 27 and 28 and lows 29 and 30 which impart a predetermined pattern of oscillating movement to arm 19 and eccentric 6, thereby imparting a reciprocatory movement to cylinder 1 which movement is imparted to carrier member 12, in additive or subtractive modification of the movement imparted thereto by the piston 9.

For a given cam formation the extent of movement of eccentric 6 can be varied by adjusting arm 20 on arm 19 thus increasing or decreasing the degree of movement imparted thereby to the cylinder 1. As will be apparent that by a suitable selection or formation of the surface of cam 17 the movement imparted to the carrier member by eccentric 6 may be imparted at the end of the forward or reverse stroke of piston 9, or be made additive or subtractive during either the forward or reverse stroke of the piston and that the timing of the modifications so imparted may be controlled by the spacing of the highs and lows of the cam and their profiles, that is the gradients of the slopes between the highs and lows, their relative positions an number, it is obvious that the movements imparted to cylinder 1 by cam 17 through eccentric 6 will be in opposite directions as the cam roll ascends to or descends from a high, respectively.

While a rotary face cam has been shown it will be understood that any type of cam may be employed.

The above described combination provides an extremely versatile and flexible transmission, simple in structure but one capable of meeting the requirements of the varied operations mentioned and one which is capable of extremely fine and intricate variations in the movement imparted to the carrier.

What is claimed is:

1. A transmission for imparting irregular reciprocatory movement to a tool or work carrier which comprises, a fluid pressure cylinder, a piston working in said cylinder and connected to the carrier, a support for the cylinder including an eccentric, and means to impart a predetermined varying pattern of rotation to said eccentric to impart a corresponding pattern of reciprocatory movement to the cylinder substantially coaxially with the piston.

2. A transmission as in claim 1 said last-named means comprising a cam.

3. A transmission as in claim 2 including means to adjust the degree of rotation imparted to the eccentric by the cam.

4. A power transmission for imparting irregular reciprocatory movement to a tool or work carrier which comprises a fluid pressure cylinder, a piston working in said cylinder, a piston rod connecting the piston to the carrier, means to alternately supply fluid pressure to opposite sides of the piston to impart a predetermined reciprocatory movement to the carrier, a cylinder supporting member extending from the opposite end of the cylinder substantially coaxial with the piston rod, a pivot shaft, an eccentric carried by said pivot shaft and fitted in an opening in said extension, an arm extending transversely from said shaft, a cam follower adjustably carried by said arm and a cam engaged by said cam follower to impart rotary movement to said pivot shaft to impart reciprocatory movement to the cylinder by consequent rotation of said eccentric in said opening.

References Cited in the file of this patent

UNITED STATES PATENTS

| | | |
|---|---|---|
| 1,196,656 | Bugbee | Aug. 29, 1916 |
| 2,169,036 | Bidwell | Aug. 8, 1939 |
| 2,249,149 | McMillin | July 15, 1941 |
| 2,415,766 | Shapiro | Feb. 11, 1947 |
| 2,633,094 | Muller | Mar. 31, 1953 |
| 2,793,548 | Kralowetz | May 28, 1957 |